United States Patent
Selman (10) Patent No.: US 7,578,933 B1
(45) Date of Patent: Aug. 25, 2009

(54) BIOLOGICAL FILTER FOR AQUATIC ECOSYSTEMS

(75) Inventor: Benjamin B. Selman, 65A Sacramento St., Cambridge, MA (US) 02138

(73) Assignee: Benjamin B. Selman, Cambridge, MA (US)

( * ) Notice: Subject to any disclaimer, the term of this patent is extended or adjusted under 35 U.S.C. 154(b) by 194 days.

(21) Appl. No.: 11/610,840

(22) Filed: Dec. 14, 2006

Related U.S. Application Data (60) Provisional application No. 60/751,124, filed on Dec. 16, 2005.

(51) Int. Cl.
*A01K 63/04* (2006.01)
*C02F 3/32* (2006.01)

(52) U.S. Cl. .............. 210/167.21; 210/167.22; 210/167.26; 210/602; 119/260; 119/261; 250/437

(58) Field of Classification Search ............ 210/167.21, 210/167.22, 167.26, 748, 602; 250/437; 119/259, 260, 261
See application file for complete search history.

(56) References Cited

U.S. PATENT DOCUMENTS

| | | | |
|---|---|---|---|
| 2,867,945 A | | 1/1959 | Gottaas et al. |
| RE24,822 E | * | 5/1960 | Pallotta et al. ......... 210/321.68 |
| 4,351,721 A | | 9/1982 | Frandsen |
| 4,690,128 A | * | 9/1987 | Gibbons ............... 126/705 |
| 4,737,278 A | | 4/1988 | Miller |
| 4,769,131 A | * | 9/1988 | Noll et al. ............ 210/85 |
| 4,995,980 A | | 2/1991 | Jaubert |
| 5,326,475 A | | 7/1994 | Kent |
| 5,536,398 A | | 7/1996 | Reinke |
| 5,647,983 A | | 7/1997 | Limcaco |
| 5,675,153 A | * | 10/1997 | Snowball ............... 250/438 |
| 5,755,961 A | | 5/1998 | Limcaco |
| 5,779,885 A | | 7/1998 | Hickok et al. |
| 5,799,612 A | | 9/1998 | Page |

(Continued)

FOREIGN PATENT DOCUMENTS

JP 05-030879 A * 2/1993

OTHER PUBLICATIONS

Adey, Walter et al, "Dynamic Aquaria-Building Living Ecosystems", 1998, pp. 31, 163-170, Publisher: Academic Press, Published in: Washington, DC.

(Continued)

*Primary Examiner*—Fred Prince
(74) *Attorney, Agent, or Firm*—William A. Loginov; Loginov & Associates, PLLC (57) ABSTRACT

This invention provides a filtration system for home aquaria that uses a closed-circuit pathway having a surface that contacts a flow of water moving between a tank inlet and tank outlet. The surface allows for algal growth thereon, and for transmission of light thereonto so as to provide photosynthetic energy to the algae. The algae acts to scrub contaminants (nitrogenous compounds, for example) as part of its growth cycle, and thereby purify the water. Additional components, such as injected air and filter media can also be provided to the water circuit to enhance algal growth, oxygenate the water and remove particulates. In an illustrative embodiment, the surface is transparent or translucent and a light that transmits appropriate wavelengths (for example, full-visible spectrum) is placed in proximity to the surface.

9 Claims, 8 Drawing Sheets

U.S. PATENT DOCUMENTS

| | | |
|---|---|---|
| 5,863,426 A | 1/1999 | Yen |
| 5,868,926 A | 2/1999 | Hickok et al. |
| 6,454,952 B1 | 9/2002 | Thorpe |
| 6,547,963 B1 * | 4/2003 | Tsai .......................... 210/232 |
| 6,730,226 B2 | 5/2004 | Takada |
| 6,837,991 B1 | 1/2005 | Norris |
| 6,932,903 B2 * | 8/2005 | Chang ........................ 210/192 |

OTHER PUBLICATIONS

Johnson et al, "Fancy Goldfish", "A Complete Guide to Care and Collecting", 2004, p. 87, Publisher: Weatherhill, Published in: New York.

* cited by examiner

BIOLOGICAL FILTER FOR AQUATIC ECOSYSTEMS

RELATED APPLICATIONS

This application claims the benefit of U.S. Provisional Application Ser. No. 60/751,124, filed Dec. 12, 2005, entitled I. AERATED ILLUMINATED HELIX ALGAL FILTER; II. AERATED BACTERIOLOGICAL HELIX FILTER; III. ROTATING BIOLOGIC AQUARIUM FILTER SYSTEM by Benjamin B. Selman, the entire disclosure of which is herein incorporated by reference.

FIELD OF THE INVENTION

This invention is related to filters for aquatic ecosystems and more particularly to home aquarium filters that employ algae or other biological organisms as a medium for processing water-borne contaminants

BACKGROUND OF THE INVENTION

Fishkeeping in home aquaria is a popular passtime in the US and elsewhere. Most home aquaria have typical water capacities in the range of approximately 10 gallons to approximately 250 gallons, although larger and smaller capacities are available. Living aquatic animals, such as fish, excrete a variety of wastes including ammonia through their gills and urine. Ammonia is toxic to fish at 1 ppm, and a fully established tank should have an ammonia level of approximately 0 parts-per-million (ppm). To maintain a sufficiently low level of ammonia and to remove other particulates virtually all fresh and salt water tanks employ a filtration system. Filters are available in a variety of types and sizes, depending largely upon the capacity of the tank.

One popular type of filter employed in smaller tanks hangs from the rim of the tank, often in the rear, and defines a chamber containing activated charcoal and other filter medium. Water enters the chamber through a siphon tube that extends deep into the tank. Filtered water exits the tank via an open outlet that creates a "waterfall" effect. A sponge is contained in the chamber to support aerobic nitrifying bacteria (nitrosomonas) that digest ammonia and excrete nitrite, which is also toxic, but less so than ammonia. Nitrite is toxic at levels of 5 ppm, and a fully established tank should have 0 ppm nitrite. Other species of aerobic bacteria, nitrosomonas and Nitrospira™ spp., consume nitrite and excrete nitrate. Nitrate is not acutely toxic to freshwater fish (though it is for marine invertebrates). A fully established tank should have nitrate levels below 40 ppm, and marine invertebrate tanks should have readings at approximately 0 ppm. The aforementioned aerobic bacteria grow and consume ammonia and nitrite most actively when they are alternately exposed to air and water. Hence, the most commercially successful filter is Snyder, et. al's Bio-Wheel, sold as Aquaria, Inc.'s Marineland brand. (U.S. Pat. No. 5,423,978 et. seq., which is expressly incorporated herein by reference)

Somewhat larger aquaria may employ a canister-type filter. The canister sits on a stand or in a cabinet remote from the tank and is interconnected to the tank's water supply by an inlet hose and return hose. A pump and/or air supply generates a circulation of water through the filter canister. The canister can included a bacteriological substrate that functions to consume ammonia and nitrite as described above. The canister may also house a particulate filter media, charcoal and/or other components, arranged so as to be accessible by a user for periodic cleaning and servicing. Both rim-mounted and canister-type bacteriological filters are limited by the inability to completely remove nitrogenous compounds from the water. To provide the best conditions for tank inhabitants, frequent water changes that remove these dissolved compounds are highly desirable. However, fresh water is often, itself, incompatible with the tank as it may contain added chlorine (due to municipal treatment) or other compounds that may harm fish.

It is generally accepted in the aquarist's art that photosynthesizing algae (See generally, Adey, Walter and Karen Loveland *Dynamic Aquaria: Building Living Ecosystems* 2d ed. (Boston: Academic Press 1998); Johnson, Erik and Richard Hess, *Fancy Goldfish: A Complete guide to Care and Collecting* (New York: Weatherhill 2004)) consume all major kinds of nitrogenous wastes (ammonia, nitrite, and nitrate) and can and should be employed in successful fishkeeping. Algae photosynthesize and thereby produce oxygen, which benefits fish.

Walter Adey describes various algae turf scrubbers in Dynamic Aquaria (1998, 2d. ed., 167-69) and in U.S. Pat. Nos. 4,333,263; 4,966,096; 5,097,795; and 5,851,398, the teachings of which are expressly incorporated herein by reference. Adey's designs generally incorporate a flat substrate upon which algae is cultivated. Adey's substrate is alternately exposed to air and water by various means, including a dump bucket that fills with aquarium water and then dumps onto said substrate, and a system where the substrate is a shallow bucket shaped like a painter's roller-brush tray and mounted on an axis. Adey's substrate bucket sits beneath a light source and tips when it is full, creating an illuminated "wet/dry" surface.

Adey's design for a home algal turf scrubber unit necessitates maintaining a large box over a home aquarium. (See, for example, Adey FIG. 1, U.S. Pat. No. 5,097,795) This design is large, expensive, cumbersome, and hampers an aquarist's access to the water in his or her tank. At the present time Adey's design has not been mass-marketed in the United States—at least not to the extent where it is commonly available in pet stores.

It is desirable to provide a filtration system that employs the highly beneficial photosynthetic and nitrogen-consuming properties of algae, but without requiring a cumbersome and hard-to-service form factor. The filtration system should be applicable to a wide range of tank sizes and occupy a minimal footprint, in keeping with the space limitations and aesthetic dictates of a personal residence.

SUMMARY OF THE INVENTION

This invention overcomes the disadvantages of the prior art by providing a filtration system for home aquaria that uses a closed-circuit pathway having a surface that contacts a flow of water moving between a tank inlet and tank outlet. The surface allows for algal growth thereon, and for transmission of light thereonto so as to provide photosynthetic energy to the algae. The algae acts to scrub contaminants (nitrogenous compounds, for example) as part of its growth cycle, and thereby purify the water. Additional components, such as injected air and filter media can also be provided to the water circuit to enhance algal growth, oxygenate the water and remove particulates.

In an illustrative embodiment, the surface is transparent or translucent and a light that transmits appropriate wavelengths (for example, full-visible spectrum) is placed in proximity to the surface. In one embodiment, a central insert with a spiral/helical ramp surface is removably mounted within an outer housing so that the outer perimeter edge of the ramp surface generally contacts the inner wall of the housing. The housing can be cylindrical and the ramp perimeter can be circular so that the ramp can be rotated to secure it via a mating screw surfaces in the housing and ramp. The Screw surfaces can be located at the base and/or top end of the insert and housing or can be formed on the inside wall of the housing so that the ramp edge meshes with a groove on the inside wall. Appropriate water-tight seals are provided to the interconnection between the insert ends and the housing so that water traveling along the rap is contained within the filter assembly. The housing includes an inlet at opposing ends of the spiral to allow water to travel into and out of the assembly, along the full length of the ramp. The interior of the insert includes a light assembly that is suitable to grow algae. The light transmits onto the ramp through a light-transmissive (transparent) insert wall that separates the water flow from the center of the insert. The light can be one or more fluorescent bulbs. The waterflow can be driven by a pump and/or air stream. At least one air inlet can be provided on the side of the housing along the ramp. The inlet is interconnected with an air pump.

In another embodiment, the central, lighted core of the filter assembly can be spiral-wrapped in removable transparent tubing that is connected between the tank inlet and outlet. The tubing allows for algal growth on its interior surface. The inner wall of the tubing can be cylindrical, or another surface shape that facilitates increases surface area for greater algal density. The tubing can be cleaned or replaced periodically to allow for fresh growth. The tubing is typically linked to one or more air inlets that inject air into the water flow. As in the other embodiments described herein, the water pathway can be linked to a filter media and/or other treatment devices in, for example, a canister, to provide further treatment to the water.

In yet another embodiment, the spiral or helix arrangement of this invention can be sealed from light, and thereby adapted to support non-photosynthetic bacteria that consume various organic contaminants in the water flow. A lighted algal spiral and darkened bacterial spiral can be provided in conjunction for maximum effect.

In another embodiment, the principles of algal scrubbing in accordance with the invention can be provided to a rim mounted enclosure including a moving "wheel surface" the wheel can be enclosed by a hood that includes a lighted region. The light can be provided by one or more bulb sources or by miniaturized sources, such as LEDs (transmitting in the appropriate wavelengths). The LEDs can be provided at a plurality of locations around the wheel so as to maximize light exposure thereonto. In a further embodiment, both an illuminated wheel section, growing algae and a non-illuminated, bacteriological wheel section can be employed in one filter enclosure to derive the beneficial filtration effects of both a bacteriological and an algal system.

BRIEF DESCRIPTION OF THE DRAWINGS

The invention description below refers to the accompanying drawings, of which.

DETAILED DESCRIPTION

I. Aerated Illuminated Helix Algal Filter

Figure 1:
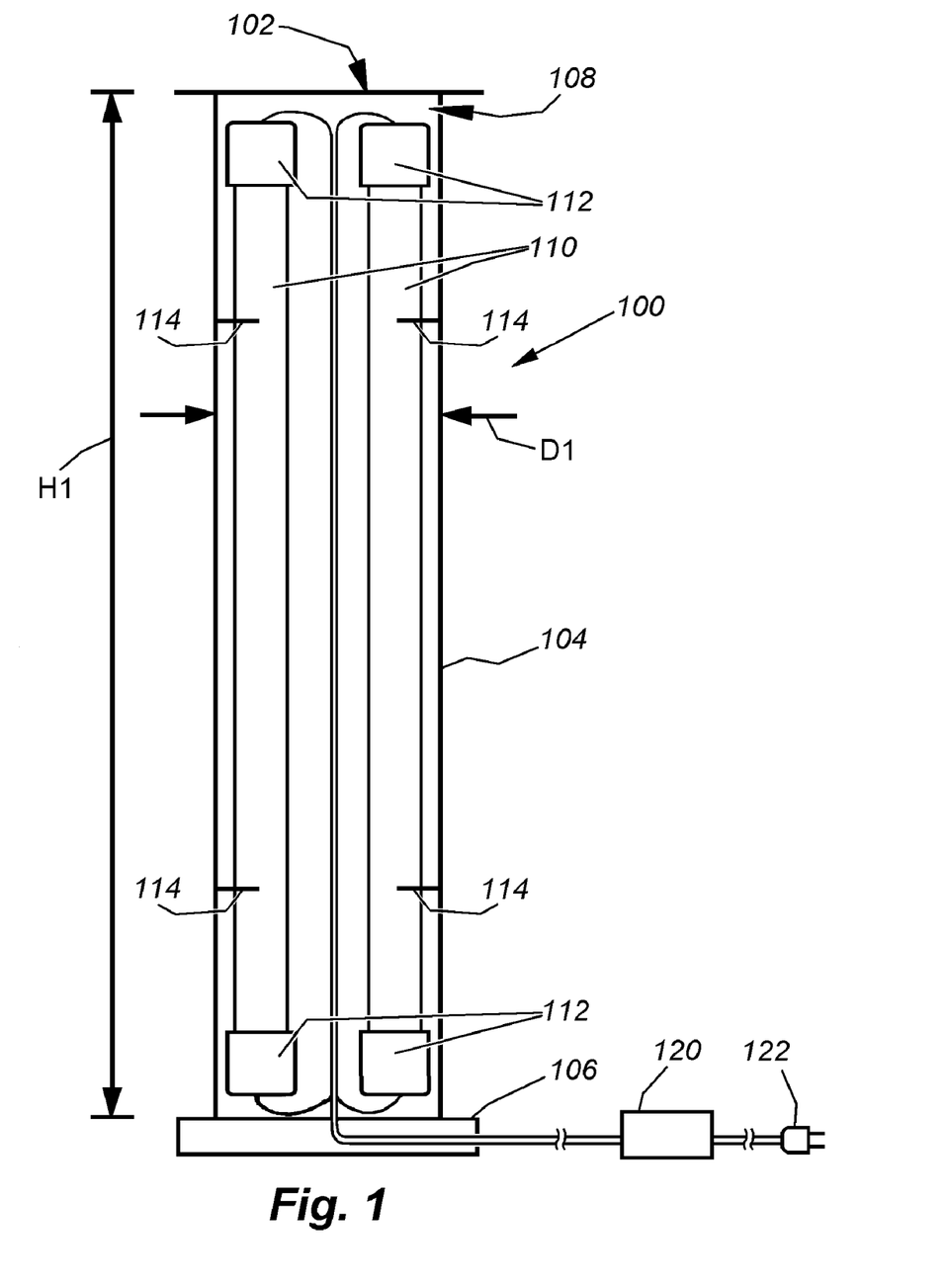
FIG. 1 is an exposed side view of the central core of an algal filtration system according to an illustrative embodiment of this invention.
Figures 2, 2A:
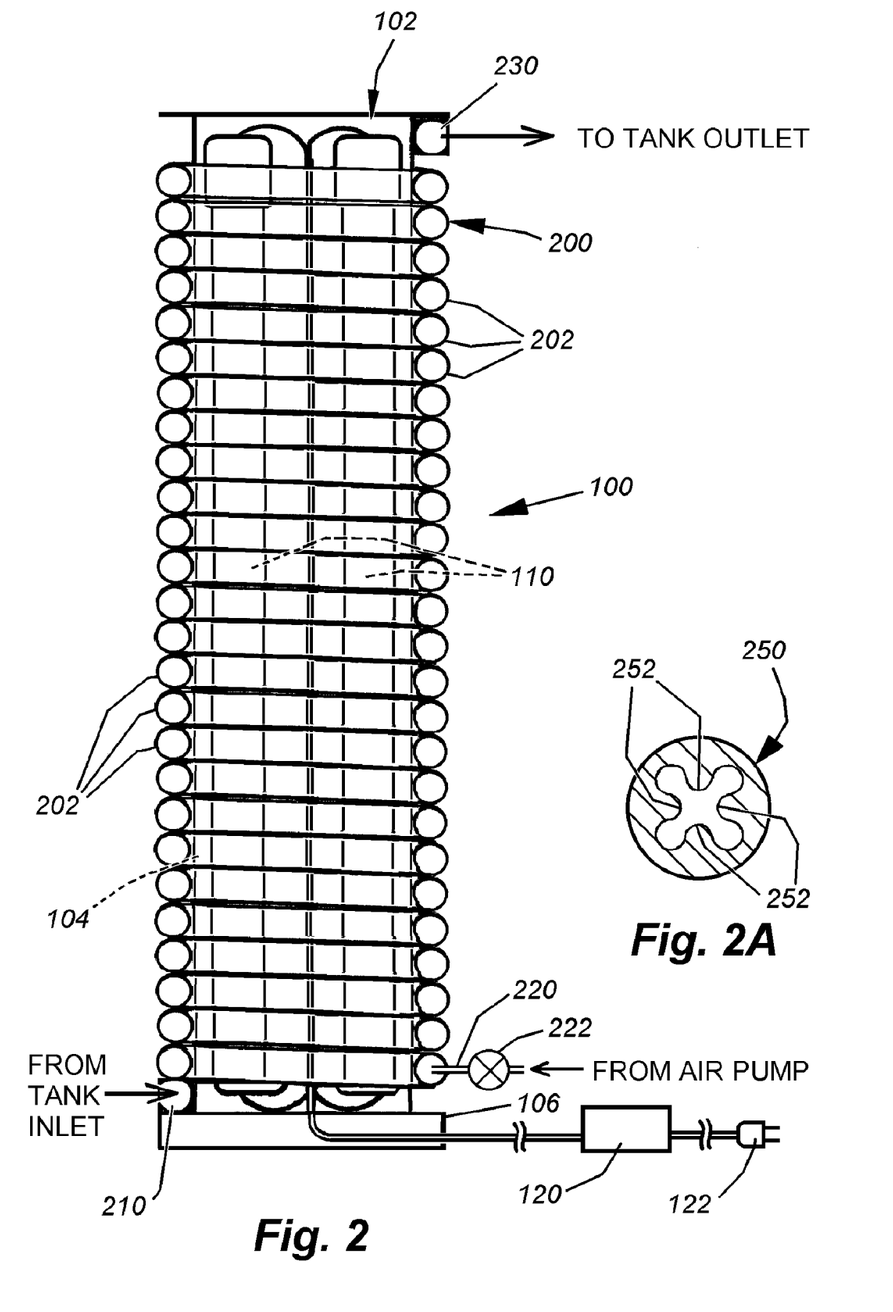
FIG. 2 is a side view of the filtration system of FIG. 1 with algal-growth tubing applied thereto.
FIG. 2A is a cross section of a tubing having increased internal surface area according to an alternate embodiment.

FIGS. 1 and 2 show the structure of an algal filtration system 100 according to an illustrative embodiment of this invention. The filtration system 100 can also be termed an Aerated Illuminated Helix Algal Filter (AIHAF) herein. In FIG. 1 the central frame or core 102 of the system 100 is shown, without the tubing (or other water-carrying conduit) s (202 in FIG. 2) that carries tank water along the filtration circuit between a tank inlet and tank outlet (not shown). The main body 104 of the frame 102 is an acrylic (or other clear/translucent material) tube, which may be of varying lengths. The tube can have any acceptable cross section shape. In this embodiment, the tube 104 is circular in cross section, but a triangular, square, polygonal, oval or other shape is expressly contemplated. An acrylic, plastic, or otherwise constructed base 106 incorporates switches and/or timers and timer controls (not shown). Within the interior space 108 of the tube 104 are two commercially available fluorescent bulbs 110. The bulbs 110 in this embodiment are conventional, elongated tubular bulbs that transmit a full-spectrum wavelength sufficient to advance the growth of green algae. As will be described below, the bulbs are sized relative to (slightly smaller than) the height Hi of the overall tube 104. The bulbs are connected to commercially available connector end caps 112, and held in place by plastic or metal clips 114 that reside against the inner wall of the tube 104. The ballast 120 that drives the fluorescent lamps 110 sits on the floor or another supporting surface, and the lamps are powered by a standard 120V plug 122 in this example. It should be noted that the type, number and size of lamps employed is highly variable.

In an alternate embodiment, screw-in compact fluorescent lamps can be employed. In general, any such lamp should transmit light in sufficient amounts, and at such wavelengths, that promote the growth of algae.

The body tube 104 is provided with a clear, translucent or generally light-transmissive. To this end, the frame body 104 shown in FIG. 1 may be constructed of other materials, i.e., metal mesh, wood posts, or glass, which will allow the light source to shine upon the external water-carrying helix 200, which is shown covering the frame 104 in FIG. 2.

With further reference to FIG. 2, the helix 200 comprises a clear, flexible plastic tubing 202. The tubing can be constructed from polyvinylchloride (PVC) or "vinyl," polyethylene, or another acceptable material that allows for light transmission through its walls. Water from the aquarium is pumped by a connecting vinyl tubing (not shown) to an input joint 2102. The input joint 210 is anchored to the main body 104 by a friction-fit clip, threaded screw, or other mechanism, and may incorporate a valve or double-valve connector for connecting the filter to its inflow tube (not shown). The interior surface of tubing acts as a substrate for nitrifying and photosynthesizing algae. Alge naturally occurs and attaches to a surface (such as the interior of the tubing 202) so long as light and air are present to promote its growth. In general, "seeding" of algae is not required, but can be undertaken if needed to expedite setup. The seeding of algae can comprise applying scrapings of live algae from another source to the inlet of the tube 202 or another location.

Air, which facilitates the growth of algae, is injected through flexible air tubing (not shown) connected to at least one air inlet 220 from a traditional aquarium air pump (not shown). The inlet (or inlets) can be mounted with a conventional check valve 222 which prevent backflow of water into the airline tuning (not shown). The inlets could also be fit with regulator valves (not shown) to particularly adjust the flow of air into the circuit. The inlet piece 220 can also be made with a venturi device (not shown) to aid input from the air pump.

A column of air and water rises upward the helix, which, depending on the relative input of air and water, could be an upward-flowing column of water punctuated by a few bubbles to an upward flowing river punctuated by walls of water which pass over the entire inner circumference of the tube. For the AIHAF 100 to maximize surface area and operate most efficiently, the volume ratio of air to water in the tube should be 1:1. The water is returned to the aquarium via outlet 230. Like the inlet fitting 210, the outlet fitting 230 secures the upper end of the tubing 202 to the frame body 104. The outlet water exits the outlet 230, and is transported back to the aquarium via an outlet tubing (not shown)

The AIHAF 100 departs from the prior art in that it incorporates a large surface area into a relatively small unit which would sit on a shelf, on the floor below the aquarium, or anywhere near the aquarium, like a traditional prior-art canister filter. Larger units can stand like towers beside the aquarium. It is generally accepted that available surface area (the air-water surface) is more important to successful fish-keeping than is total volume of water (Johnson, et. al, 87). The depicted helix design, when properly adjusted with a roughly 50/50 air volume ratio, creates a substantial addition to the user's aquarium system's surface area. For example, ½ in. interior-diameter tubing adds one square inch of surface area to a tank for every two inches of tubing. A typical 50-55 gal. tank, measuring 13"×48" surface area, has roughly 624 sq. in. of air/water surface area. A helix AIHAF surrounding a 24" bulb, properly filled with a 50/50 air/water mixture, would add roughly 175 sq. in. of surface area to the user's aquarium system.) This increase in surface area is one of the major advantages of the claimed aerated helix design. Thus, it is contemplated that a typical, round-cross section ½-inch inner-diameter tube (202) wrapped around a 6-8-inch outer-diameter (illustrated diameter D1) body (104) having a height Hi of approximately 24-26 inches could achieve the needed filtration for a 55-gallon tank with a modest fish population. Such a tubing would have a path length of approximately 650 inches (54 feet). If constructed with ½-inch inner diameter tubing, this specified length would yield approximately 1,023 square inches (7.1 square feet) of algae surface area. The precise diameter and height of the frame is varied based upon the number of fish being housed and the overall capacity of the tank, as well as water temperature and related environmental factors. Tables specifying the proper size filter system can be established and provided to users to aid in deciding on selection of the correct size unit. In some implementations, the use of smaller, multiple units may be desirable. Such units may be connected in series to a single tank inlet and single tank outlet, or each discrete unit can be provided with its own respective inlet and outlet.

While a small degree of propulsion is provided by the injected air stream, typically, the inlet or outlet of the AIHAF 100 (and others described below) are connected in-line with a fluid impeller pump (or any other type of fluid-driving mechanism) that positively drives the water through the circuit at a desired flow rate. See, for example, the inline pump 431 in FIG. 4. In addition, the AIHAF 100 inlet or outlet can be connected in line with an enclosure that contains fibrous material, a bacteriological sponge, activated charcoal and/or other components that remove particulates and/or other contaminants that are not removed by the algae. See for example, the optional filter 450 in FIG. 4. Alternatively, a conventional bacteriological filter can be applied to the tank to be used in parallel with the AIHAF 100 to achieve the desired filtration effect. As will be described below, FIG. 8 details one type of arrangement in which conventional filtration and algal filtration coexist in a single unit.

The surface area of a tubing can be increased by varying the inner wall surface to increase the available surface area per unit of length. FIG. 2A shows a tubing 250 with a complex interior surface having a plurality of undulations 252. This shape can be formed using conventional molding and/or extrusion processes. The precise geometry of such an interior surface is highly variable.

The use of a tubing in which to cultivate algae is highly efficient. However, within a few weeks, algae tends to mature, growing long and therefore consuming reduced quantities of nitrogenous compounds than younger, actively growing algae. In addition, older, dense algal growth tends to attenuate the light transmission through the surface from the source. Growth is, in fact, thickest in the direction of the light source, thereby blocking transmission of light onto the diametrally opposed inner surface of the tube. This then causes algae growth on the opposed surface to eventually die off from lack of light, fundamentally reducing the total surface are of algae in the system. Moreover, mature, thick-growing algae tends to reduce the diametral area of the tube, which reduces or even occludes water flow through the system. Absent desired water flow, the system is inoperative. Thus, older algae should be cleaned out, allowing new growth to occur on a regular basis. In this regard, a tubing may be less convenient as its interior surface is more difficult to access. One technique for cleaning tubing is to insert a flexible brush or "snake" and pass the brush back and forth over the inner surface. Where a long length of tubing is employed, the use of a brush may be impractical or highly inconvenient. As an alternative, the tube can simply be discarded after a few weeks in favor of a new tube, which is then attached to the inlet 220 and outlet ends.

However, this approach is wasteful and may not appeal to some users.

Figures 3, 3A:
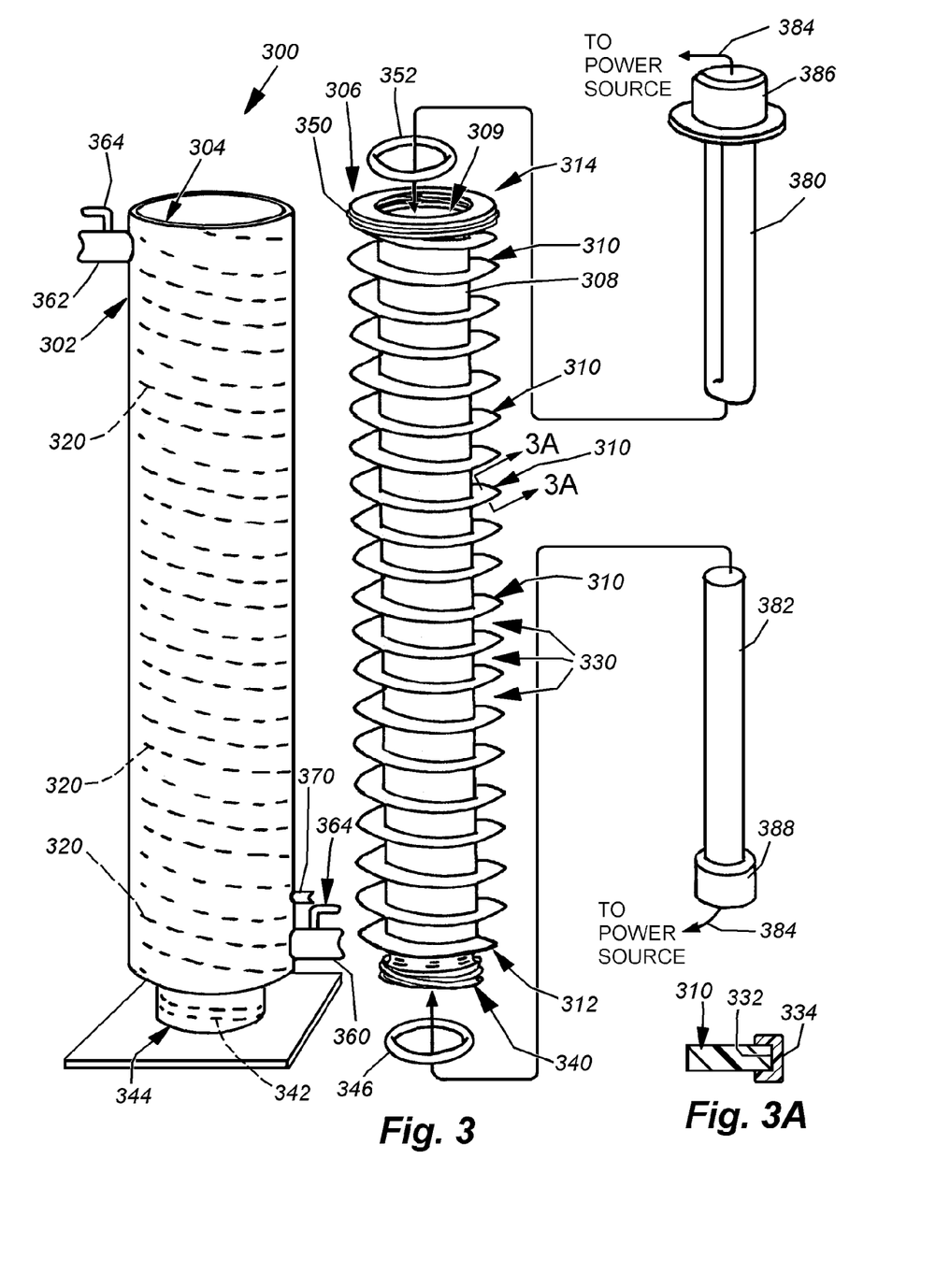
FIG. 3 is an exploded perspective view of an algal filtration system according to an illustrative embodiment including a removable spiral ramp insert.
FIG. 3A is a side cross section of the spiral ramp edge and an exemplary seal taken along line 3A-3A of FIG. 3.
Figures 4, 4A:
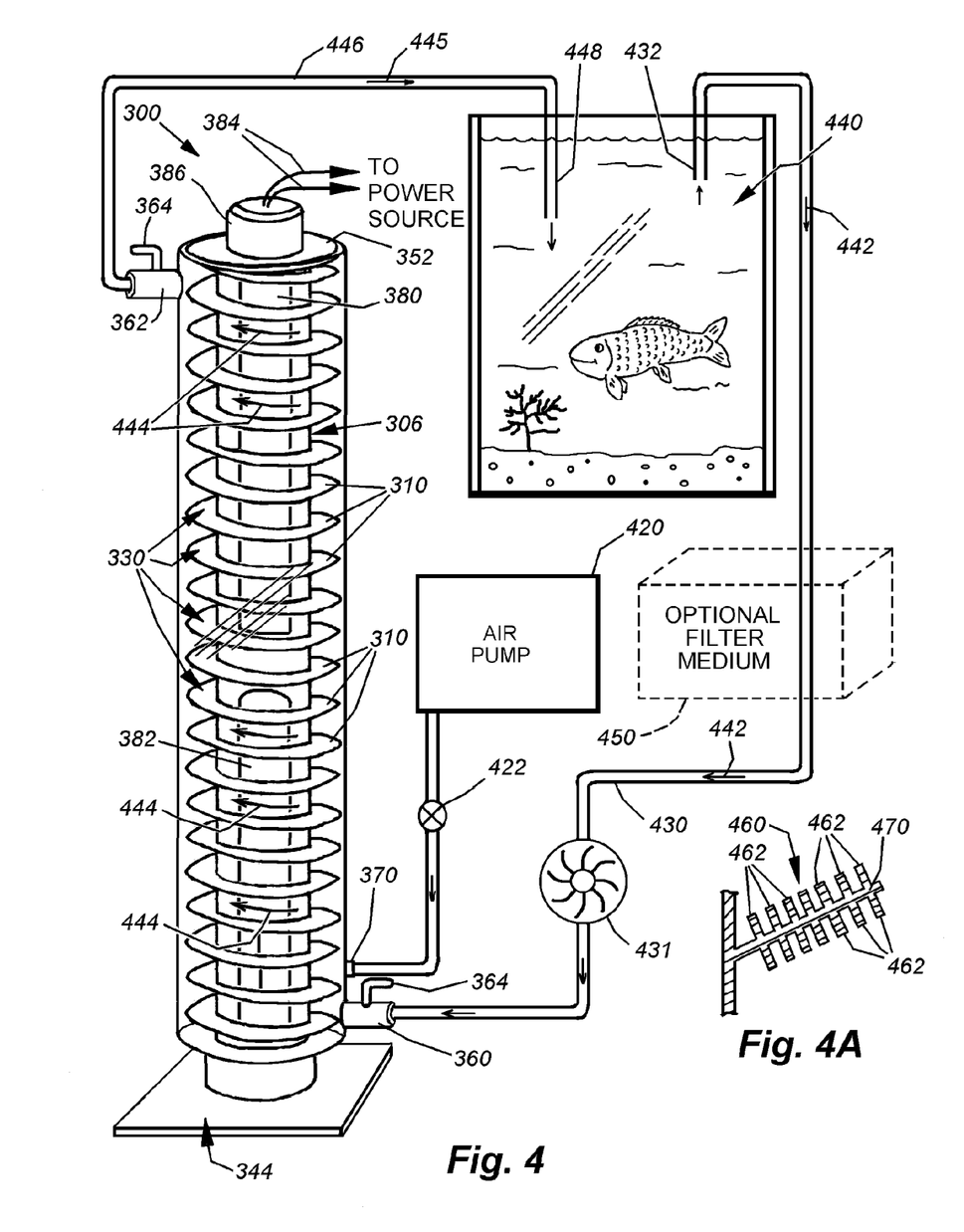
FIG. 4 is a perspective view of the assembled filtration system of FIG. 3 in operation.
FIG. 4A is a fragmentary side cross section of a ramp segment having a complex surface shape with increased surface area for use, for example, in the system of FIG. 3.

FIGS. 3, 3A, and 4 detail an AIHAF unit 300 according to an illustrative embodiment in which the components are easily disassembled for cleaning, and afford a large degree of surface area for algal growth, thereby rendering a highly user-friendly system. With reference to FIG. 3, the unit 300 consists of an outer housing 302 having a cylindrical inner wall 304. The housing is sized to receive an inner core member 306 that defines a central tube 308 having a light-transmissive surface. The interior cavity 309 of the core tube 308 is isolated from the exterior so as to remain water-tight. The exterior wall of the core tube 308 is surrounded by a continuous spiral/helical ramp surface 310. The ramp surface extends from the tube bottom 312 to the tube top 314. The outer diameter of the ramp 310 is sized in circumference to closely conform with the inner wall 304 of the outer enclosure 320. In this manner when the core member is inserted into the enclosure, the ramp edge comes into close contact with the inner wall 304 (as represented by the phantom line 320). By maintaining a close conformance between the ramp edge and the enclosure's inner wall, the cavity space 330 defined between adjacent ramp sections produces a continuous spiral conduit along which water can flow.

Referring briefly to FIG. 3A, to enhance the seal between adjacent conduit spaces the ramp edge 332 can be provided with a sealing strip 334 that flexes or moves to closely engage the inner wall of the enclosure. This strip is optional.

The central core 306 is secured within the enclosure by a variety of mechanical techniques. In a basic embodiment, the core 306 is simply press fitted into the enclosure. In the illustrative embodiment, the core 306 is secured into the enclosure by a male-threaded base section 340 that mates with a conforming female thread 342 (shown in phantom) in the base 344 of the enclosure. An O-ring seal 346 can be applied between the enclosure base 344 and core base 340 to prevent migration of water out of the spiral. A similar O-ring seal 350 is attached to the top ring 352 of the core 306 to block the escape of water. A variety of well-known sealing techniques can be employed at either end of the unit in accordance with alternate embodiments. The opposing ends of the spiral are arranged so that their open spaces confront a respective inlet 360 and outlet 362. As shown, the inlet and outlet can be provided with movable stop-cocks 364 that allow the flow of water to be cut-off during assembly and disassembly (and also to allow for general flow regulation). At least one air inlet 370 is provided along the wall of the enclosure so that air from a pump (420 in FIG. 4) can be injected (via check valve 422) into the spiral to aerate the algae and drive the water flow therethrough.

The core tube's interior cavity 309 is provided with one or more light sources 380, 382. The size, shape and type of light source is highly variable. In this example, a compact-style fluorescent bulb 380 is inserted at one end of the cavity while a tubular fluorescent or incandescent bulb 382 is inserted at the other end. A full-length tubular bulb or a plurality of parallel bulbs can be employed in alternate embodiments, depending upon the size and shape of the interior cavity. Likewise solid-state light sources, such as a bank of LEDs, positioned against the inner surface of the core tube 308, can be employed in alternate embodiments. The sealed interior 309 of the core tube 308 facilitates placement of wires 384 and other electrical components. These components are channeled out of the top (as shown) or base of the unit 300. Due to the ease of unit disassembly, the bulbs 380, 382 and other electrical components are easily accessible form the top and/ or bottom of the device. Appropriate mounting bases 386, 388 are employed to secure and orient the bulbs 380, 382, respectively, within the core tube 308.

The diameter of the core tube 308, housing 302 and spacing between adjacent ramp sections 310 determines the amount of surface area available for algal growth in this embodiment. The area between ramp sections 310 should also sized to maintain a desired level of water flow. Clearly, a large space will provided for a slower current at a given pump rate (e.g. gallons-per-minute), while a small space will provide an increased current for the same pump rate. Some sources suggest that a 10-gallon-per-minute flow rate per-square-meter of algae surface is appropriate (See Adey, *Dynamic Aquaria*, p. 31). In the illustrative embodiments of the flow rate is less than one-gallon-per-minute-per-square-meter. To compensate for a lower flow rate, the algae surface-to-volume of water ratio of the illustrative invention is increased. For example, Adey specifies 0.085 square-meter of algae surface for a 70-gallon aquarium. Conversely, an illustrative embodiment of the invention has operated with approximately 0.66 square meters in a 50 gallon tank.

As shown in FIG. 4, the assembled unit 300 is connected by an inlet tube 430 to the inlet 432 of an established aquarium tank 440. Water flows (arrows 442) out of the tank 440, and into the base of the spiral. Water passes up the spiral (arrows 444) to the top-end outlet 362. The water then flows (arrow 445) along an outlet tubing 446 back to an outlet 448 in the tank 440. Air is injected by the pump 420 via the inlet 370 near the spiral base. In this embodiment, the airflow drives the water in the general direction (arrows 445) of water flow. However, as described above, an impeller pump 431 is provided along the circuit, either in line with the outlet 362 or the inlet 360 (adjacent to the inlet in this example), or integrally with the unit. The pump 431 provides a requisite flow rate. It can include an adjustment mechanism of conventional design (not shown) for varying flow rate.

It should be clear that the unit 300 is quite easy to service using no tools. The user simply cuts off the water flow using the cocks 364, unscrews the core 308 from the housing 302, withdraws the core axially, removes the electrical components, and then swabs out/rinses both the housing and spiral. Reassembly occurs in the opposite order to disassembly.

As shown in FIG. 4A, the surface area of the spiral ramp 460 can be increased by providing a plurality of veins 462 or other protuberances to the base spiral surface 470. Alternatively, the spiral surface can be constructed with undulations or another complex pattern. These complex ramp surface shapes can help facilitate the compaction of the overall device by concentrating more algae into a smaller space.

Referring again to FIG. 4, an optional particulate and/or chemical filtration system 450 is shown (in phantom) inline with the inlet. This system can be omitted in alternate embodiments or provided inline with the outlet 446.

Figure 5:
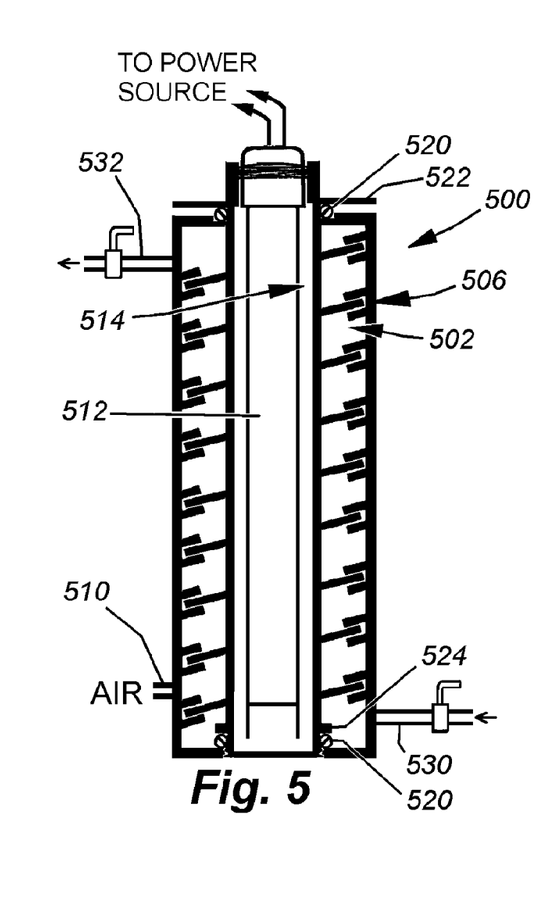
FIG. 5 is a side cross section of an algal filtration system with a spiral ramp in accordance with an alternate embodiment.
Figure 5A:
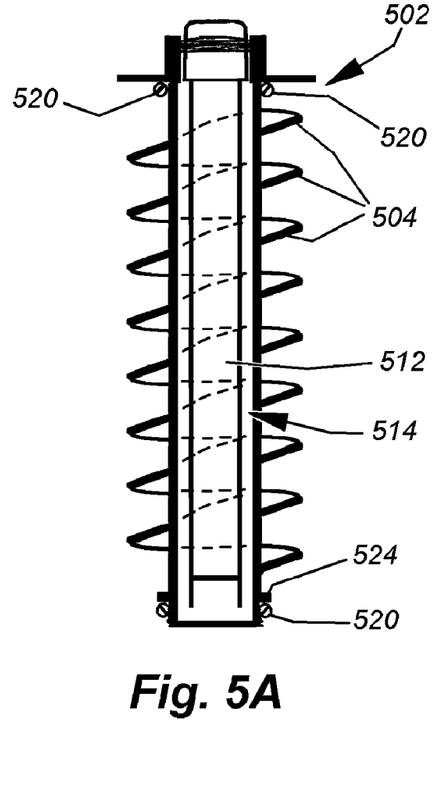
FIG. 5A is a side cross section of the spiral ramp removed form the system enclosure of FIG. 5.
Figure 5B:
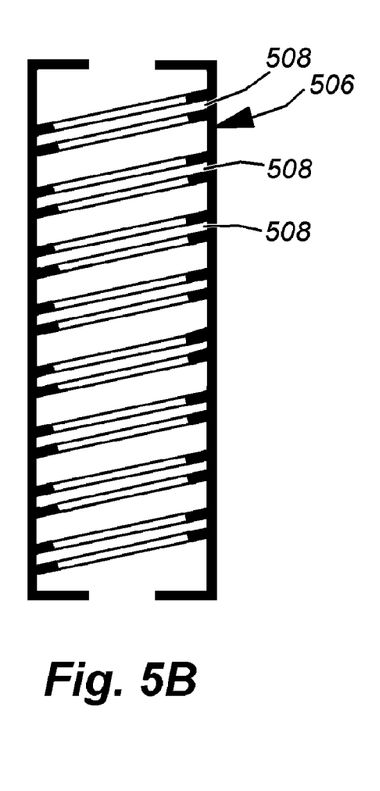
FIG. 5B is a side cross section of the system enclosure of FIG. 5 with spiral ramp removed therefrom.

FIGS. 5, 5A and 5B detail another embodiment of a spiral/ helix-based filtration system according to this invention, designed for ease of cleaning. Similar to the above-described filtration unit 300 (FIGS. 3 and 4) the system (500, shown assembled in FIG. 5) is molded or otherwise fabricated from transparent acrylic, clear plastic, or glass. The system 500 is comprised of a spiral ramp 502 (FIG. 5A) with ramp edges 504 that define a male screw and a cylindrical receptacle or enclosure 506 (FIG. 5B) with a molded internal groove 508 that extends in a spiral along the inner wall of the housing 506. The groove 508 is particularly sized and arranged as a female thread to receive the ramp edge 504. At least one air-injection site 510 is molded into the female part 506. The light source 512 resides in the watertight central space 514 within the male component 502. In this embodiment, the source 512 is a single tubular bulb. In alternate embodiments, a plurality of bulbs can be employed and/or solid state sources, such as LEDs can be used. The user can unscrew the male component 502 from the female enclosure 506 in the event of excessive algae growth, or to otherwise service the unit. A sturdy handle or wrench, or some similar device can aid the user is turning the pieces. The joints at which the auger-like threads (edges 504) join the female grooves 508 tend to exhibit a good seal therebetween, but need not be perfectly watertight, as a small trickle of backflow will not harm the filter process. Nevertheless, the unit ends are sealed by conventional seals or O-rings 520 that are compressed between the enclosure wall and corresponding flanges 522 and 524 on the respective top and bottom of the male component 502. Similar to the above-described unit 300, the inlet 530 and outlet 532 are arranged at opposing ends of the enclosure 506, and include stop-cocks 540 that regulate water flow. The overall height, diameter and relative spacing of adjacent ramp sections are each highly variable so as to increase or decrease the effective algal-growth surface area.

It should be noted that, if the helix is left uncovered, the AIHAF acts as lamp and an aesthetic part of the aquarium system. When in operation, the AIHAF casts a flickering campfire-like glow which draws the eye and provides a pleasing or soothing effect. Additionally, children and others can learn about the biology of algae as they watch a palette of brown, red, and green algae populate their filters day by day.

As such, over time (in as little as a few days in a relatively new aquarium), colonies of various species of algae will grow on the interior of the tubing or ramp. This algae will include brown crusting algae, green crusting algae, green carpeting algae, and green hair algae. As algae grow and photosynthesize they will absorb ammonia, nitrite, nitrate, phosphate, and any heavy metals from the water. In response, the algae release oxygen into the water and air, which is benefits fish and invertebrate life.

II. Illumination Device for Rotating Biological Aquarium Filter

Figure 6:
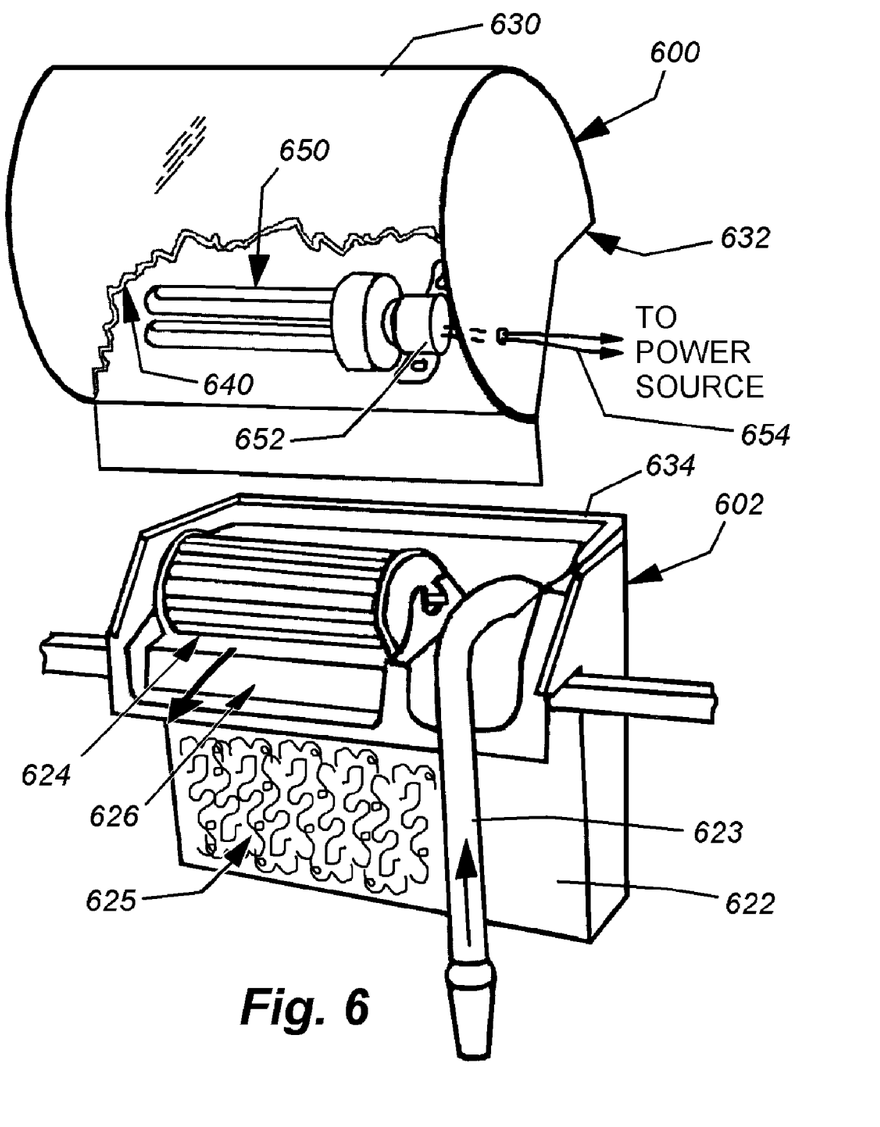
FIG. 6 is a partially exposed, exploded perspective view of an algal filtration system having a moving biological-substrate wheel and employing a rim-mounted enclosure and lighted covering hood in accordance with an illustrative embodiment of this invention.

FIG. 6 depicts an Illumination Device for Rotating Biological Aquarium Filter IDRBAF 600 according to an illustrative embodiment employed in conjunction with a conventional rotating biologic filter system 602. As described in Snyder, et. al's patents, water is drawn from the aquarium into filter box 622 via an inlet tube 623. The inlet tube is operatively connected to an impeller pump (not shown) that generates a flow of water into the filter box 622. The water passes through a filter medium (charcoal, fibrous material, etc.) 625 in the box 622 and is then returned to tank past the "Bio-Wheel," 624 via a rim outlet 626 over which the filtered water cascades.

In accordance with the conventional implementation, the Bio-Wheel 624 is covered by an opaque black hood (not shown) to encourage the growth of nitrifying bacteria. Various improved models incorporate sprayer bars which spray water directly onto the wheel as it turns.

According to an illustrative embodiment, the prior art's bacteriological wheel is converted into an algal wheel by means of an enclosed light hood 630, which is part of the IDRBAF 600 of this invention. The IDRBAF 600 can be provided as a replacement hood which is hinged or otherwise friction-fit (as shown) at its rear connection site 632 to the rim 634 of the filter box 622. The hood 630 contains a light source 650, shown behind the cut-away of the hood 630. An appropriate socket 652 is provided to secure and power the bulb via a conventional cord 654 and ballast (not shown). The bulb can be sealed behind a window or other structure that prevents the splashing of water thereonto. The hood 630 has in inner surface 640 that is reflective (painted white for example) or specular and is shaped to reflect light in the general direction of the wheel 624. The light source 650 in this embodiment is a full-spectrum compact fluorescent bulb. It is contemplated that a compact fluorescent light source typically generates some heat and may necessitate a hood with a profile (i.e., visible height above the top level of the tank) several inches higher that that of current Bio-Wheel models.

The moving wheel 624 is an ideal structure upon which to cultivate algae. In particular, water and air are provided in a fairly constant 50:50 ratio, as each point on the wheel spends approximately half its time submerged and half its time exposed to air as it rotates within the box waterline. Note that this embodiment is fairly easy to service. The hood is removed to access the wheel 624 and box 622. If the algae on the wheel becomes so overgrown that it stops turning, it can simply be brushed clean from time to time.

Figure 7:
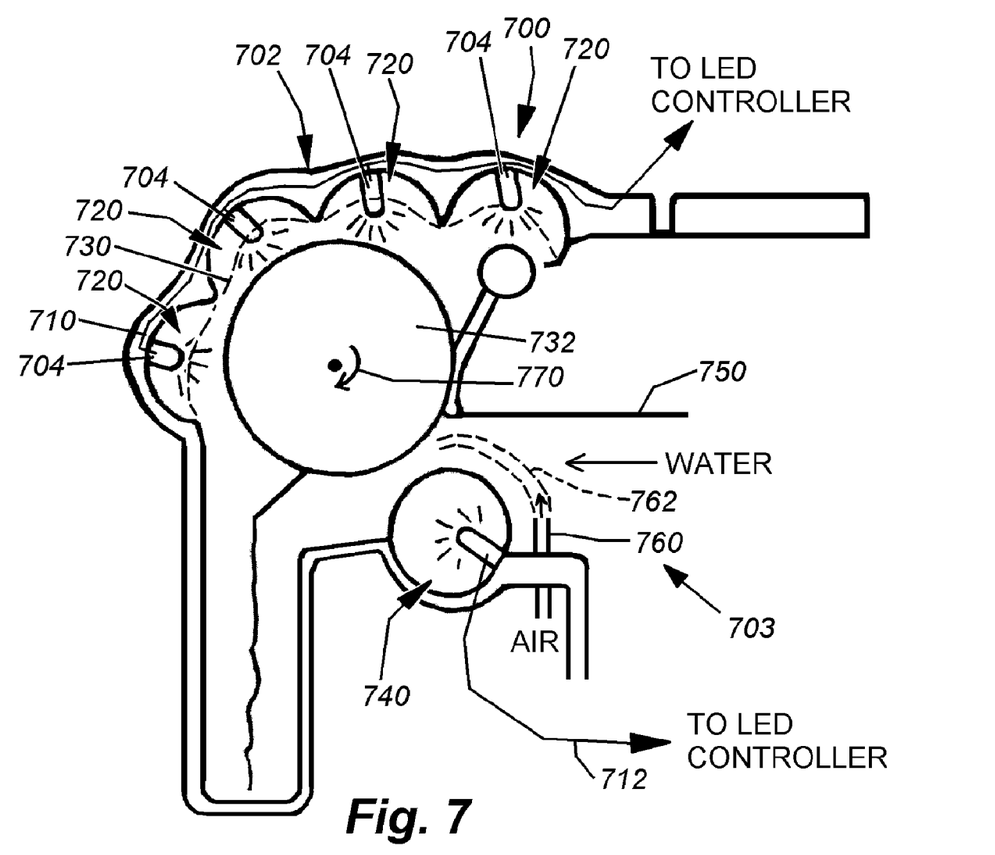
FIG. 7 is a side cross section of an algal filtration system having a moving biological-substrate wheel and employing an array of miniaturized light elements (LEDs for example) in conjunction with a rim-mounted enclosure according to an alternate embodiment.

FIG. 7 details an alternate embodiment for an IDRBAF 700 in accordance with an illustrative embodiment of this invention. In this embodiment, the profile of the hood 702 that covers a filter box 703 is significantly lower as a consequence of the use of solid state light sources 704. In particular, the hood 702 defines an overall height and profile almost exactly identical to that Marineland's "Bio-Wheel" and "Emperor" line of filters. The IDRBAF 700 differs from the prior art in that the light sources 704 are strategically-placed high-output full spectrum LEDs, located along the inside of the hood 702. The LEDs are connected to a controller/driver circuit and power, via embedded leads 710, 712 The LEDs 704 are placed in recesses or domes 720 in the hood 702, which are colored white or made specular, thereby maximizing their reflective value and generating the most illumination-per-LED. A thin sheet of transparent material 730 can lie between the LEDs 704 and the Bio-Wheel 732 to avoid water damage to the LEDs. The LEDs in each recess are spread across the width of the hood in a line that is packed in a manner which maximizes light output. An optional under-wheel LED line 740 is provided that increases light exposure around the circumference of the wheel 732. This line 740 can be provided as an integral part of the filter box 703 or as an add-on that is applied beneath the box, isolated from the filter box water. Since most filter boxes are transparent, the light penetrates through the box wall in any case. In an alternate embodiment an-in tank line (or lines) of LEDs can be provided. Such lines are sealed against water infiltration using known sealing techniques, and can be directly submerged below the waterline 750 in proximity to the wheel 732. Since LEDs operate at low DC voltages, the risk of shock or fire is greatly reduced.

Air is optionally injected at a site 760 that is molded into (or subsequently attached to) the filter box from an air pump (refer above), and such air can be directed by a tube or nozzle 762 (shown in phantom) toward the Bio-Wheel 732 so as to help it rotate (curved rotation arrow 770). In an alternate embodiment, some hood models could feature a hood that is a solid bank of LEDs (not shown), which are sealed off from the water using a membrane.

Figure 7A:
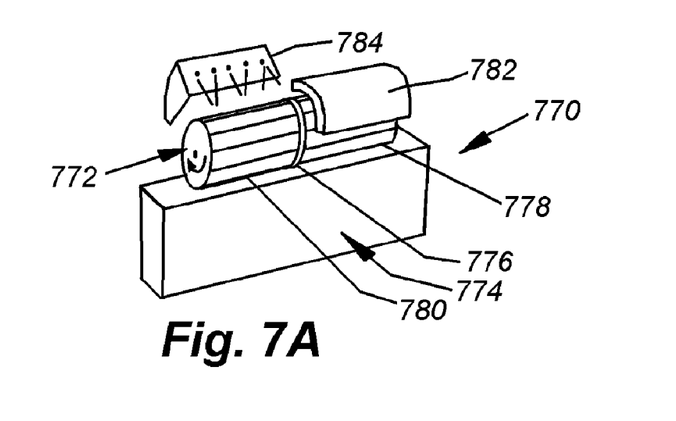
FIG. 7A is a schematic perspective view of a biological filtration system having a moving biological-substrate wheel that is bifurcated and employing a divided hood having elements that promote both bacteriological and algal growth in predetermined sections of the wheel.

With brief reference to FIG. 7A, a filtration system 770, which employs both bacteriological and algal filtration mechanisms is shown. In this embodiment, the wheel 772, residing in a somewhat conventional filter box 774, is divided by a divider 776 into two parts 778 and 780. The location of the divider 776 and relative length of each part 778, 780 is highly variable. For example, the algal part of the overall wheel 772 may be twice the length of the bacteriological part. As depicted, the wheel 772 is covered by two different hood structures that may be formed integrally or unitarily. The bacteriological part 778 is covered by a darkened, closely conforming hood section 783 that minimized infiltration of light thereonto. This facilitates the growth of nitrifying bacteria. Likewise, the algal part 780 is covered by an illuminated hood section 784 that projects a light using LEDs or another light source onto the section 780, which is sufficient to promote the growth of algae onto this portion of the wheel. In this manner the filter serves double-duty as both a bacteriological filter and an algal filter.

III. Aerated Helix Bacteriological Filter

Figure 8:
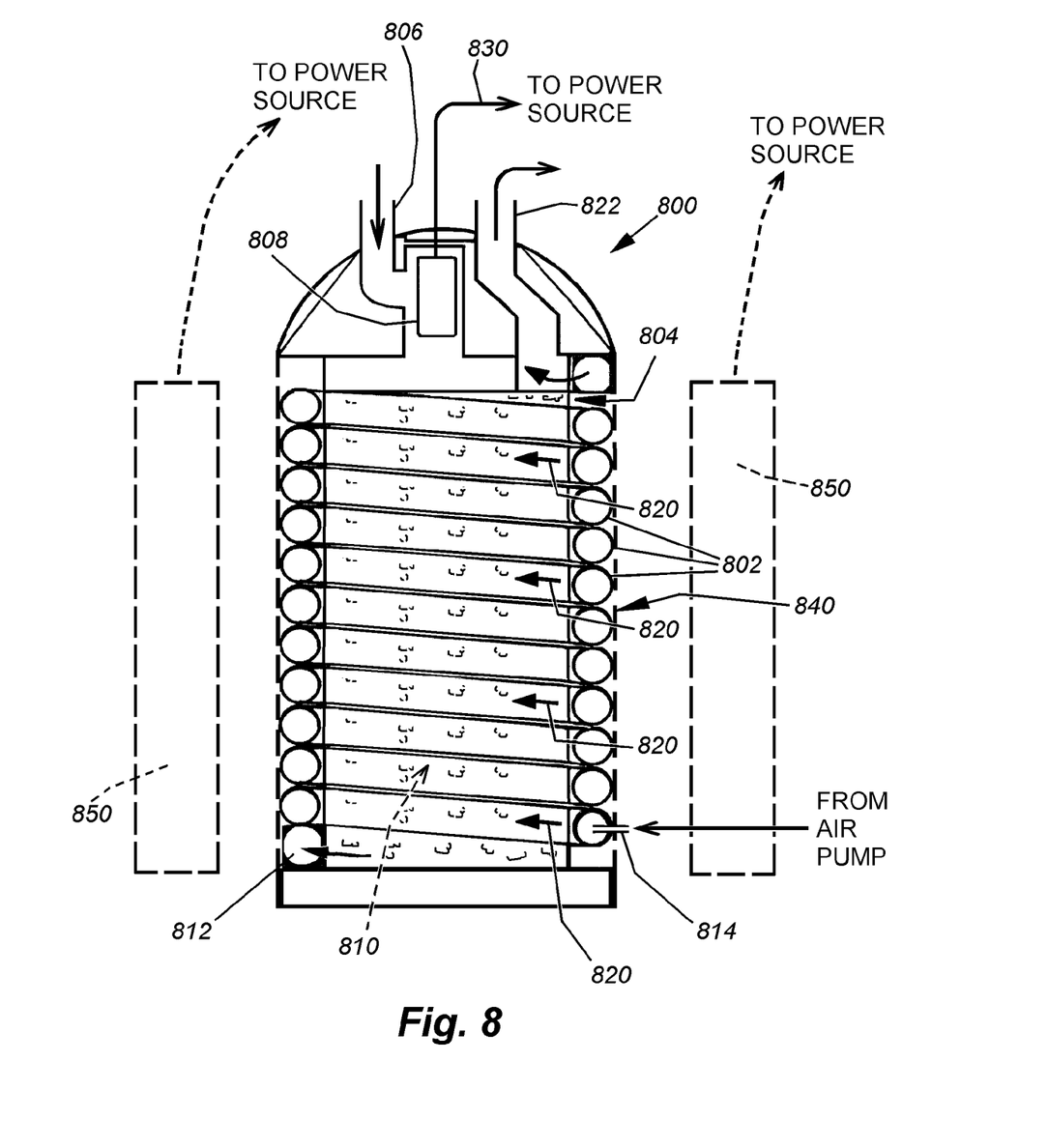
FIG. 8 is an exposed side view of a combined algal or bacteriological spiral growth tube and filter media canister in accordance with an alternate embodiment.

FIG. 8 shows an Aerated Helix Bacteriological Filter (AHBF) 800, which is similar in construction to the AIHAF. An opaque tube 802 forms a helix around an acrylic or plastic housing 804. The AHBF's housing 804 is sealed, like a conventional canister filter. Unfiltered water from the aquarium tank is drawn into inlet 806 by impeller pump 808 and forced down through baskets which may contain various filter media (sponge, activated carbon, ceramic substrates, etc.) 810, and thereafter, into the helix's inlet 812. As in the AIHAF, air is injected into the column of water in at least one inlet location 814. The admixture of air and water rises through the helix (arrows 820), and in doing so makes the surface of the interior of the opaque tubing 802 alternately exposed to air and water. On this surface (the substrate, the surface area of which may be increased by tree-like or tiny finger-like projections) grow colonies of nitrosomonas, Nitrospira™ and nitrobacter bacteria which consume nitrogenous fish waste (ammonia and nitrite, respectively) and produce less-toxic nitrate.

Partially purified water is returned to the tank via outlet 822, which may be equipped with a conventional coupling mechanism to facilitate attaching and detaching the tubing which runs to the aquarium (not shown). The unit is powered by a standard 120V AC cord 830, or another power source.

An optional outer casing 840 (shown in phantom) can be placed around the tubing 802 to limit light infiltration. In alternate embodiments, the casing may extend part way along the height of the unit 800 and optional lights 850 (shown in phantom) may be applied to a clear-walled tubing. In this manner, both bacteriological and algal growth occur within the tubing. Alternatively, lights 850 can be applied directly to the full length of a clear or partially opaque tubing to provide the combined algal filter and canister-borne filter media as described generally above. In alternate embodiments, tubing can be substituted with a spiral ramp that is removably accessible by the outer covering 840—providing an easy-to-service unit.

The foregoing has been a detailed description of illustrative embodiments of the invention. Various modifications and additions can be made without departing from the spirit and scope if this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, the size and shape of the various filters described herein are highly variable. Additionally, any of the implementations for a spiral/helix described herein can be modified to include multiple layers of growth substrate that support bacteria, algae or a combination of bacteria and algae. Further, where a spiral ramp is employed, it is contemplated that the ram may be attached to the outer enclosure and that the inner core may be detachably engaged therefrom. Accordingly, this description is meant to be taken only by way of example, and not to otherwise limit the scope of this invention.

What is claimed is:

1. An aquarium filter comprising:
   a core having a light mounted therein, the core allowing light to pass therethrough;
   a spiral conduit surrounding the core and extending between an inlet that receives unfiltered water from the aquarium and an outlet that returns the water passing through the conduit to the aquarium;
   wherein a surface of the conduit receives light from the core and the light is constructed and arranged to facilitate growth of algae and wherein the surface is adapted to enable the algae to grow thereon; and
   wherein the core is removably secured to an outer enclosure by a male thread that mates with a conforming female thread, thereby allowing the spiral conduit surrounding the core to be scraped to further facilitate growth of algae on the spiral conduit.

2. The filter as set forth in claim 1 wherein the conduit comprises a clear tube wrapped around the core.

3. The filter as set forth in claim 1 wherein the conduit comprises a spiral ramp mounted between an inner wall of the outer enclosure and an outer wall of the core, and wherein the core is detachable from the outer enclosure thereby allowing the spiral ramp to be selectively exposed.

4. The filter as set forth in claim 3 wherein the ramp is attached to the core and the core is removably secured to the outer enclosure.

5. The filter as set forth in claim 1 further comprising a filter medium interconnected with the conduit.

6. The filter as set forth in claim 1 further comprising a substrate that supports bacteriological filtration interconnected with the conduit.

7. An aquarium filter comprising:
   a core having a light mounted therein, the core allowing light to pass therethrough;
   a spiral conduit surrounding the core and extending between an inlet that receives unfiltered water from the aquarium and an outlet that returns the water passing through the conduit to the aquarium;
   wherein a surface of the conduit receives light from the core and the light is constructed and arranged to facilitate growth of algae and wherein the surface is adapted to enable the algae to grow thereon;
   wherein the conduit comprises a spiral ramp mounted between an inner wall of an outer enclosure and an outer wall of the core, and wherein the core is detachable from the outer enclosure thereby allowing the spiral ramp to be selectively exposed;
   wherein the ramp is attached to the core and the core is removably secured to the outer enclosure; and
   wherein the core includes a screw thread that mates with a screw thread on the outer enclosure.

8. The filter as set forth in claim 7 wherein the ramp includes an edge constructed and arranged to threadingly engage a groove disposed along the inner wall of the outer enclosure.

9. An aquarium filter comprising:
   a core having a light mounted therein, the core allowing light to pass therethrough;
   a spiral conduit surrounding the core and extending between an inlet that receives unfiltered water from the aquarium and an outlet that returns the water passing through the conduit to the aquarium;
   wherein a surface of the conduit receives light from the core and the light is constructed and arranged to facilitate growth of algae and wherein the surface is adapted to enable the algae to grow thereon; and
   at least one air inlet that provides air to the conduit.

* * * * *